United States Patent
Laub

[11] 3,988,531
[45] Oct. 26, 1976

[54] SYSTEM FOR COMPENSATING FOR INCORRECT DUTY FACTOR WHEN READING OUT INFORMATION STORED IN A VIDEO DISC

[75] Inventor: Leonard J. Laub, Chicago, Ill.

[73] Assignee: Zenith Radio Corporation, Chicago, Ill.

[22] Filed: Apr. 2, 1975

[21] Appl. No.: 564,388

[52] U.S. Cl. .................. 178/6.6 DD; 178/6.6 DC; 178/6.6 TC; 179/100.3 V; 360/36; 360/38
[51] Int. Cl.$^2$ ................... H04N 5/76; G11B 7/00
[58] Field of Search ..... 178/6.6 R, 6.6 DD, 6.6 DC, 178/6.6 TC, 67 A; 179/100.3 V; 358/4, 8; 360/24–25, 27–30, 36, 38

[56] References Cited
UNITED STATES PATENTS

| | | | |
|---|---|---|---|
| 3,347,984 | 10/1967 | Holmberg | 360/38 |
| 3,906,152 | 9/1975 | Hoogendisk | 360/28 |
| 3,911,476 | 10/1975 | Keizer | 358/4 |
| 3,912,858 | 10/1975 | Kenney | 178/6.6 R |

OTHER PUBLICATIONS

Hnnan et al., Automatic Correction of Timing Errors in Magnetic Tape Recorders, IEEE Transactions on Military Electronics, 7–10/65, pp. 246–254.

Edwardson, The Digital Timing-Connection of Video Tape Recorded Color Television, Proceedings of the Conf. on Video and Data Recording, 10–12 July 73, pp. 27–39.

*Primary Examiner*—Raymond F. Cardillo, Jr.
*Attorney, Agent, or Firm*—Cornelius J. O'Connor

[57] ABSTRACT

In an optical video disc where the storage track is a succession of cavities or pits alternating with a like succession of lands, these elements ideally have a certain length, determined by the encoding method used. Experience shows, however, that they may in practice suffer unintended length variations giving rise to duty factor error. A compensating change is made to the duty factor of the signal developed in reading the disc in order to obviate spurious components attributable to duty factor error and otherwise the source of distortion in image reproduction.

4 Claims, 32 Drawing Figures

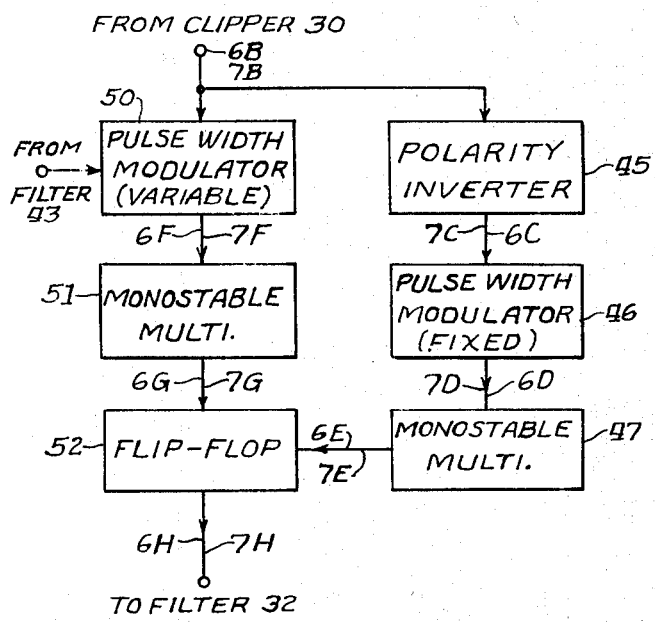
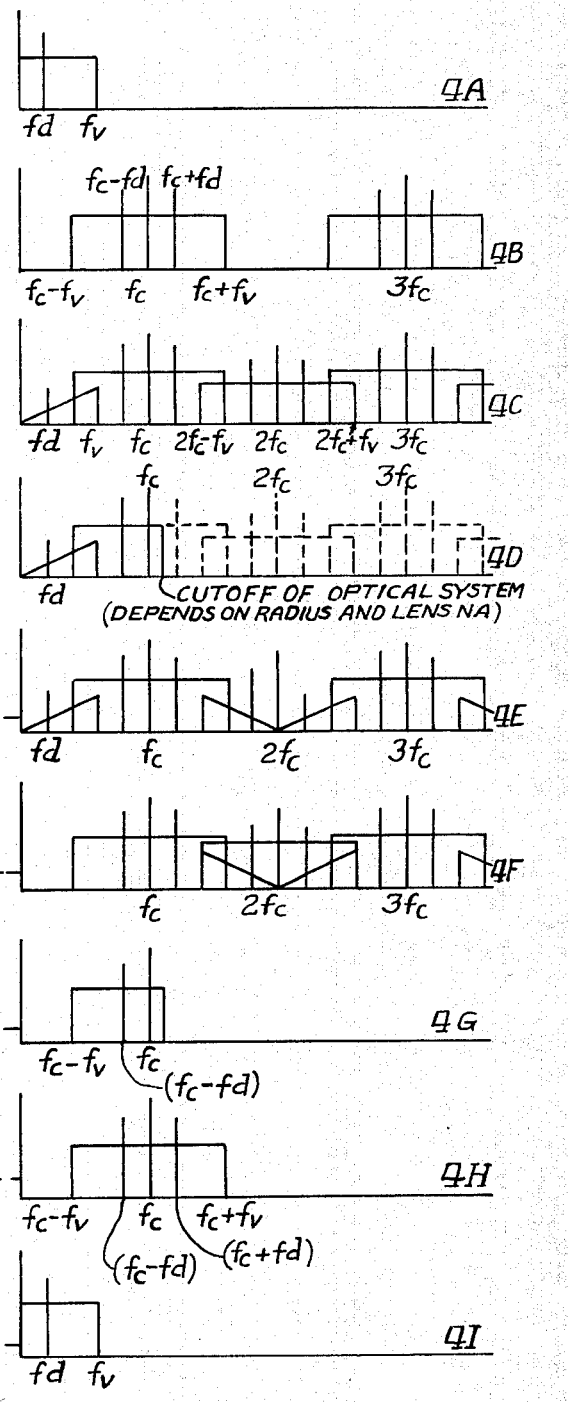
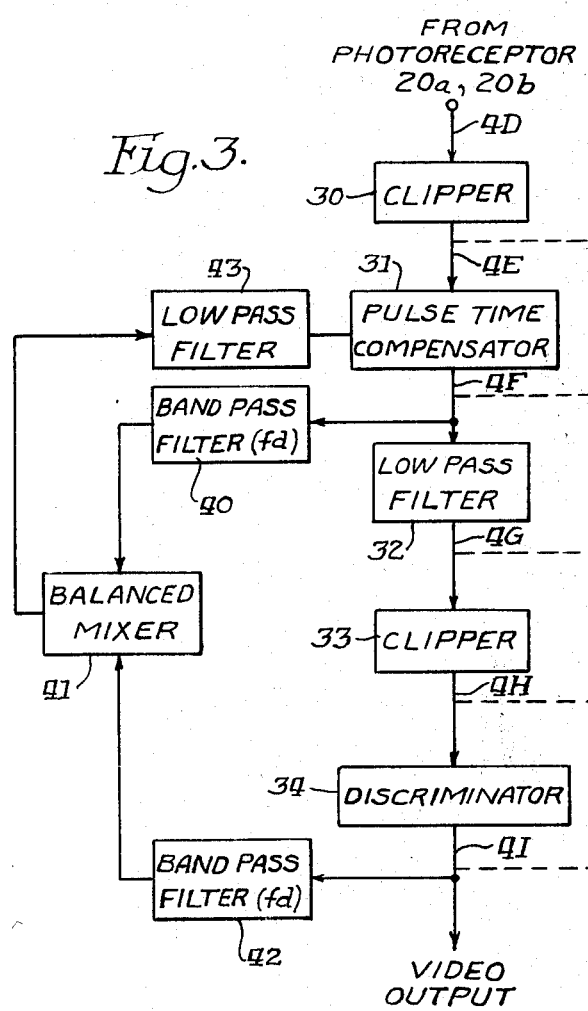

SYSTEM FOR COMPENSATING FOR INCORRECT DUTY FACTOR WHEN READING OUT INFORMATION STORED IN A VIDEO DISC

RELATED APPLICATION

This application is related to a concurrently filed application Ser. No. 564,389, of Adrianus Korpel, assigned to the assignee of the present invention. The Korpel application likewise concerns duty factor compensation but achieves the desired result by adding a signal of suitable polarity, amplitude and spectral composition to cancel the spurious signal components resulting from duty factor error, whereas the subject application achieves an equivalent result by a compensating change in duty factor of the output signal obtained by reading the disc.

BACKGROUND OF THE INVENTION

The Korpel application, which is incorporated herein by reference, explains duty factor error and the consequences of it in relation to the relative frequencies of the frequency modulated carrier stored in the disc and the highest video frequency component desired to be reproduced. For example, if the mean carrier frequency is not at least twice the highest video frequency component to be translated, an interpenetration condition exists between the band of spurious components attributable to duty factor error and the lower sideband modulation components of the carrier. The Korpel application discloses one method of obtaining acceptable image reproduction in spite of such interpenetration relying on the principle of cancellation of the spurious components. The present invention has a common objective but obtains the desired result differently, namely, by introducing a compensating duty factor error or modulation to the frequency modulated carrier developed by reading the disc.

Accordingly, it is an object of the invention to provide a novel arrangement for compensating duty factor error in an optical video playback system.

SUMMARY OF THE INVENTION

The invention relates to an optical video playback system for reading out information stored in the form of a track on a video record. Such a track comprises a succession of pits separated by lands for which there is a desired duty factor but which, in the presence of pit distortion, exhibits duty factor error. The pits and lands collectively constitute a spatial representation of a carrier signal frequency modulated by a band of video components and by another component that is unrelated to video information. In the presence of duty factor error, this other component produces a spurious counterpart in the baseband. An arrangement for adjusting duty factor to compensate for duty factor error comprises a photoreceptor responsive to the reading of the record track with a beam of energy to derive an output signal representative of the frequency modulated carrier. In the presence of duty factor error, that output signal is further representative of the aforesaid spurious component and has a phase and intensity indicative of the sense and extent of duty factor error. A frequency selector is provided for deriving the spurious component from the output of the photoreceptor. A compensator comprises means responsive to the derived output signal for developing a first set of timing signals. Means responsive to the derived spurious component is included for selectively delaying alternate transitional portions of the derived output signal by an amount related to the amplitude of the spurious component in order to develop a series of adjusted width pulses. Means responsive to these adjusted width pulses serve to develop a second set of timing signals. Finally, means responsive to the first and second set of timing signals is provided for generating a signal having a duty factor corresponding to the desired duty factor. This generated signal adjusts the duty factor of the derived frequency modulated output signal thereby compensating for duty factor error.

BRIEF DESCRIPTION OF THE DRAWINGS

The features of the invention believed to be novel are set forth with particularity in the appended claims. The invention, together with further objects and advantages thereof, may best be understood by reference to the following description taken in conjunction with the accompanying drawings in the several figures of which like reference characters identify like elements and in which:

FIG. 3 is a block diagram of an arrangement constructed in accordance with the invention to compensate duty factor error;

FIG. 4 is a sequence of amplitude-frequency characteristics employed in explaining the operation of the arrangement of FIG. 3;

FIG. 5 is a block diagram of the components constituting the pulse time compensator of the arrangement of FIG. 3;

DESCRIPTION OF THE PREFERRED EMBODIMENT

Figure 1:
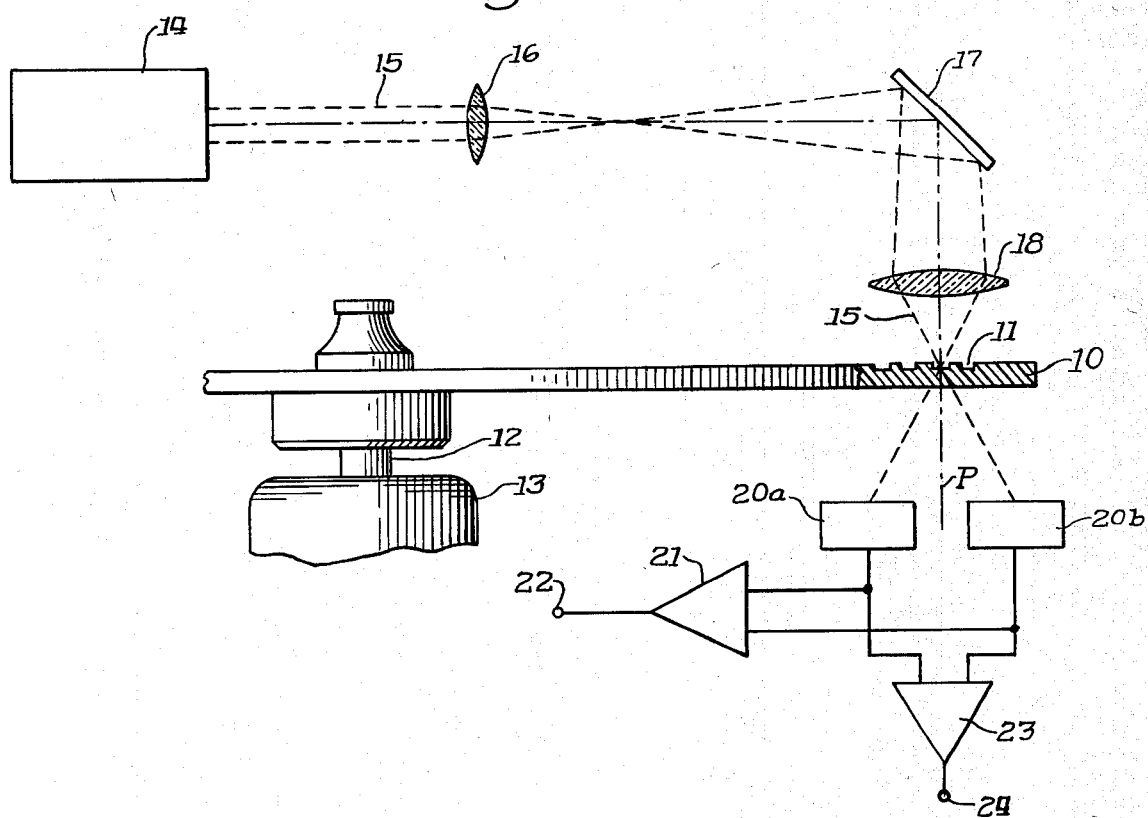
FIG. 1 is a schematic representation of an optical video playback system with which the invention may advantageously be employed.

The optical playback system of FIG. 1 reads out information stored in a record or video disc 10 of suitable material, such as polyvinyl chloride, which has the capability of storing program information. The information is stored in a multiturn spiral shaped track 11 formed on one surface of the disc as a succession of cavities or pits and a like succession of lands which alternate with the pits to the end that they collectively constitute a spatial representation of a carrier signal frequency modulated by program information. Disc 10 with the stored program information is a replica of a master carefully constructed to store the program and utilized in a replicating process.

The master may be a glass disc which is coated with a photoresist material to respond to actinic energy, such as a laser beam, controlled by a carrier signal which is frequency modulated with the program information. The laser in scanning the master in a spiral pattern, while it is modulated by the program bearing carrier signal, develops elemental areas of the coating that are soluble in a known solvent as well as intervening elemental areas that are insoluble. Development of the master after exposure to the modulated laser beam produces a storage track having pits and lands constituting a spatial representation of the frequency modulated carrier signal. Of course, the replicating process causes disc 10 to have a similar storage track of pits and lands.

Usually the program information borne by the carrier signal includes luminance information in the form of a band of video components, chroma information in the form of an amplitude and phase modulated subcarrier and at least synchronizing information. One or more subcarriers modulated with audio may also be included. It is convenient to arrange the constituent parts of the program in accordance with the NTSC format to be used directly in preparing the master. Alternatively, the constituent parts of the program may have specifically different but related frequency assignments to those found in the NTSC format so that simple transcoding permits ready conversion from one form to the other.

Disc 10 may be of sufficient thickness to be mechanically rigid in which case it is supported on a turntable in the playback apparatus and the disc is given a conductive coating to operate in the reflective mode. Alternatively, and as indicated in FIG. 1, the disc may be so thin as to be flexible in which case it is supported on a spindle 12 driven by a motor 13 which rotates the spindle and disc at a relatively high speed, of the order of 1800 rpm, to accomplish what is referred to as flying the disc. Since the record track is a spatial representation of the frequency modulated carrier wave signal under the control of which the track has been prepared, reading of the track with a laser or light beam develops a correspondingly modulated carrier wave signal. The means for scanning the track comprises a laser source 14 which projects a beam 15 of monochromatic light through an intermediate lens 16 and, by way of a mirror 17 to a final or objective lens 18 which focuses the beam onto the segment of track 11 which is instantaneously in the reading position. While not shown in the drawing, mirror 17 is frequently supported for controlled displacement about two orthogonally related axes to correct errors that are usually encountered in such a system. One of these has to do with radial tracking and the other with timing.

Since there is no mechanical coupling of the reading beam with the video disc, it is necessary to provide some means for maintaining the beam in radial tracking registration with the storage track. Servo systems for accomplishing that result are known in the art. They develop an error signal which has a polarity designating the direction of radial misregistration and an amplitude related to the degree of misregistration. That signal is employed to accomplish controlled displacement of mirror 17 about the axis which determines the radial position of beam 15.

Timing errors are attributable to eccentricities of the disc and may be corrected by controlled displacement of the beam in the proper direction along a path that is tangential to the storage track at the place where it is read by beam 15. Here again an error signal is required and it is usually obtained by providing a pilot signal on the disc which may be read out and supplied to a phase detector which also receives a phase reference signal and, in response thereto, develops a second error signal having a polarity and amplitude related to the sense and extent of the timing error. It is used to displace mirror 17 in an orthogonal direction to that relied on for radial correction.

Servo systems necessary for radial and timing corrections constitute no part of the present invention and, simply for convenience, have not been illustrated in the drawing.

In order to track the disc and read out all segments of its storage track, it is necessary that the reading spot be moved radially over the disc at an appropriate speed. This, too, is well understood in the art and has been omitted from the drawing for the sake of simplifying the schematic representation.

Most frequently flexible optical discs are transmissive to the reading beam and this has been assumed to be the case in the arrangement of FIG. 1, although operation in the reflective mode is feasible. With a transmissive disc, there are photoreceptor means 20a and 20b positioned on the side of the disc opposite that from which the reading beam approaches. The photoreceptor is indicated as simply a pair of photocells aligned with one another on opposite sides of a reference plane P which is perpendicular to the diameter of disc 10 and tangent to track 11 at the point of the reading spot. This is a very simple light pick up arrangement and may be replaced by a matrix of four photocells similarly displaced relative to the reference plane as two pairs on opposite sides of that plane and with the elements of each pair displaced in opposite senses from reference plane P in the direction of the storage track. For the simple two cell case, the outputs of the photocells are combined additively in a summing amplifier 21 to deliver to an output terminal 22, in response to scanning of the record, a carrier wave signal frequency modulated with the same program information employed in preparing the master from which disc 10 has been derived. These outputs are differentially combined in another amplifier 23 to make available at a second output terminal 24 a radial error correction signal. Obviously, amplifier 23 would be included in the radial servo loop which, as explained above, has been omitted from the drawing. A particularly effective matrix of four photocells is described and claimed in copending application, Ser. No. 519,897, filed Nov. 1, 1974, in the names of Robert Adler and John Rennick and assigned to the assignee of the present invention.

Figure 2:
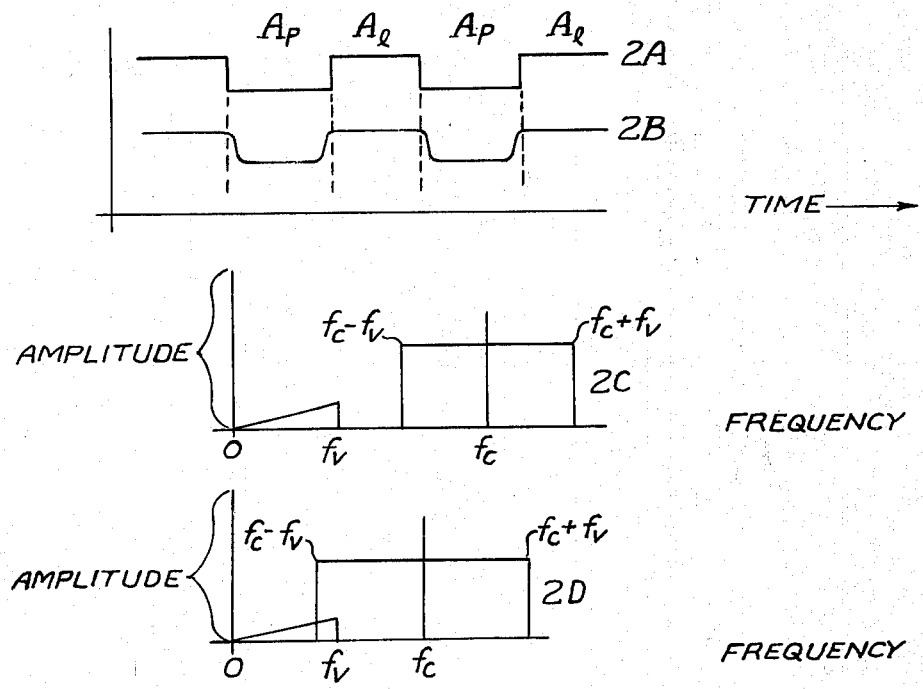
FIG. 2, consisting of 2A through 2D, contains curves used in explaining duty factor error and its consequence in an optical video system.

Curve 2A of FIG. 2 is a rectangular waveform that may represent the frequency modulated carrier signal employed to control the laser used in mastering and, for ideal conditions, further represents pits $A_p$ and the intervening lands $A_l$ which constitute the storage track of disc 10. Where this optimum condition is satisfied, the system in FIG. 1 delivers to output terminal 22 an accurate replica of the program modulated signal used to control the laser in mastering and that signal is suitable for application to a color television receiver, for example, to obtain image reproduction. In practice, however, such ideal conditions are seldom met and the shape of the storage track segment may be more nearly like the representation in curve 2B. The construction lines extending between curves 2A and 2B reflect one possible difference between the intended waveform (curve 2A) and the actual track contour on the record (curve 2B). It will be observed that the leading edges of the pits appear to have been delayed and their trailing edges appear to have been advanced, providing a change or reduction in duty factor of the pits and, therefore, a condition referred to as duty factor error. A number of reasons account for this possible distortion, such as incomplete exposure of the photoresist in the mastering process and memory effects or cold-flow phenomenon of the disc material.

In the presence of duty factor error the signal output of the photoreceptor in the playback apparatus will have an amplitude-frequency characteristic of the type shown by curves 2C and 2D of FIG. 2, depending upon the relationship of the nominal frequency of the frequency modulated carrier in relation to the highest video frequency component to be reproduced. In curve 2C, for example, the carrier signal $f_c$ has a lower modulation sideband $f_c$ to $f_c - f_v$ and an upper modulation sideband $f_c$ to $f_c + f_v$, where $f_v$ is the highest frequency video component to be reproduced. It is only this modulated signal that is developed in the photoreceptor for the optimum case of no duty factor error but where such error is experienced there are also present spurious signals within the band $0$ to $f_v$. The band of spurious components has a general correspondence to the band of video components modulated on carrier $f_c$ and its spectrum has a triangular amplitude-frequency characteristic with a slope of 6 dB/octave because the amplitude of any component within the spurious band is weighted by a factor proportional to that frequency. Moreover, it may be shown that the amplitude of the spurious components is proportional, both in sign and magnitude, to the percentage error in duty cycle factor, that is to say, to the sense and extent of duty factor error.

The frequency relationships of curve 2C apply where the carrier frequency $f_c$ exceeds twice the frequency $f_v$ of the highest video frequency component desired to be reproduced. In such a case filtering is effective to eliminate the band of spurious components, confining the output signal of the player to the desired $f_c$ and its modulation sidebands.

In the frequency spectrum of curve 2D, however, the carrier frequency $f_c$ is less than twice the frequency of the highest video component to be reproduced. Consequently, there is interpenetration between the modulation sidebands of the desired carrier signal and the band of spurious components attributable to duty factor error. Filtering can not now be resorted to in order to eliminate the spurious components completely and utilizing the output of the video player in the presence of interpenetration of these bands occasions impairment of the reproduced image, especially as to chroma. Such impairment is minimized or obviated by operating upon the signal output of the photoreceptor in accordance with the principles of the subject invention. This can be readily understood in relation to the apparatus embodiment of FIG. 3 and the signal spectra of FIG. 4.

Following the photoreceptor 20a, 20b, the signal translating apparatus of the player includes a clipper 30 to which the output signal of the photoreceptor is applied by way of amplifier 21 and terminal 22. The clipper, in turn, delivers a signal to a pulse time compensator 31 which, in the absence of duty factor error, simply translates the signal, albeit with some delay, from clipper 30 to the usual discriminator and FM detector 34 by way of a low pass filter 32 and a second clipper 33. This filter and clipper are functionally important only in the presence of duty factor error and their purpose will be explained hereinafter. If the system does experience duty factor error, a spurious signal component, the counterpart of a pilot signal presently to be described, is available in the baseband of the signal spectrum and may be selected by a narrow band filter 40 to energize or activate compensator 31. If the system is expected to be subject only to duty factor error in one sense, say a shortening of the pits, the output of filter 40 is sufficient to control compensator 31 and that compensator then has its simplest construction. To provide for the more general case where duty factor errors of both senses are to be accommodated, a second filter 42 derives the pilot signal component from the output of detector 34 for application to a balanced mixer 41 along with the output of filter 40. In this case, with the balanced mixer functioning essentially the same as a phase detector, an output or error signal is obtained with a polarity indicative of the sense of duty factor error and an amplitude manifesting the extent. The output of mixer 41 may be applied through a low pass filter 43 as the actuating signal for compensator 31. The structural makeup of compensator 31 and its operation will be described hereafter but it is appropriate first to review the overall signal translating process of the playback system, assigning to compensator 31 its role in compensating duty factor error.

More particularly, it will be assumed that the signal components modulating the carrier signal $f_c$ comprise a band of video components extending up to an upper limit $f_v$. Within that band, according to the present invention, is a component that may be considered in the nature of a pilot signal, designated in curve 4A as $f_d$. It is essentially independent of video information and its frequency value is chosen to the end that in the presence of duty factor error a counterpart component $f_d$ thereof appears in the part of the baseband not occupied by the lower modulation sideband. The spectrum resulting from the modulation of the (square-wave) carrier with the signal content of curve 4A is illustrated in curve 4B which further represents the spectrum to be obtained from photoreceptor 20a, 20b by reading the player under optimum conditions wherein a 50% duty factor is established. In that case, of course, there is obviously no need for compensation and the signal output of the player is simply delivered without significant modification to discriminator detector 34 and the detected video output is available from the "video output" for utilization in the usual way.

If optimum conditions do not prevail and duty factor error is present, the output signal which theoretically is developed in photoreceptor 20a, 20b of the playback system by reading the disc with beam 15 has the spectrum shown in curve 4C. (For convenience, legends have been applied to the block diagram of FIG. 3 to indicate where the various signals represented by the curves of FIG. 4 are available.) In explaining this spectrum, it will be understood that the duty factor is everywhere different from the optimum and, therefore, the reproduced waveform resulting from reading the disc is not symmetrical. Indeed, both d.c. and even harmonics of the carrier frequency $f_c$ appear in the waveform's spectrum, as shown in curve 4C. Additionally, since the local duty factor is a function of the local carrier frequency in any region of the track, the duty factor is modulated by the video and pilot information with the result that the d.c. and even harmonics introduced by the overall asymmetry are themselves modulated by the video and pilot information. This modulation of the d.c. component produces the tri-angularly shaped spurious baseband component.

As a matter of practice, however, the optical system has passband limitations which cut off slightly above the frequency $f_c$ of the carrier signal and, therefore, only that portion of the spectrum shown in full-line construction in curve 4D is derived in the output of the photoreceptor; the remainder of the spectrum shown in broken-line construction and including even as well as odd harmonics is eliminated by virtue of being beyond the passband capability of the optics system of the player. With the signal of curve 4D delivered to clipper 30 its effect in restoring symmetry of the modulation sidebands is shown in curve 4E. With the signal spectrum of curve 4E applied to compensator 31, the counterpart $f_d$ of the pilot signal occurring in the baseband is available for selection by filter 40. It is used to develop an error signal which, in turn, actuates compensator 31 in a manner presently to be described to cause the duty factor of the signal supplied to the compensator to be modulated in a complimentary sense to the duty factor error of the signal developed in the photoreceptor. With this compensating change in duty factor, a corrected signal, shown in curve 4F and partially simulating optimum operation of the playback in respect of duty factor considerations, is delivered through a low pass filter 32 and clipper 33 to discriminator detector 34. Filter 32 eliminates from the signal spectrum of curve 4F, illustrating the partially corrected signal occasioned by compensator 31, harmonics of the carrier signal $f_c$ and their accompanying modulation sidebands, including such of the upper modulation sideband of $f_c$ as is penetrated by other modulation products. Elimination of the harmonic content from the output signal of compensator 31 avoids impairment that may otherwise be experienced in an image reproduced under the control of the signal output of detector 34. Such impairment can be avoided by having filter 32 cut off at a frequency slightly in excess of the carrier $f_c$ so that its output has the spectrum of curve 4G. The symmetry of the modulation sidebands of this signal is restored by clipper 33 which delivers a signal to detector 34 having the spectrum of curve 4H. Consequently, the detected output available at the terminal designated "video output" has the spectrum of curve 4I. It will be seen to duplicate the stored program information represented in curve 4A. Filter 42 selects the pilot signal component $f_d$ for application to mixer 41 which also receives from filter 40 the counterpart $f_d$ in the band of spurious components. The response of the mixer to these inputs is the development of a duty-factor-error correction signal having a polarity indicative of the sense and an intensity related to the extent of duty factor error. It is this signal that actuates pulse time compensator 31 to effect compensation.

Figure 6:
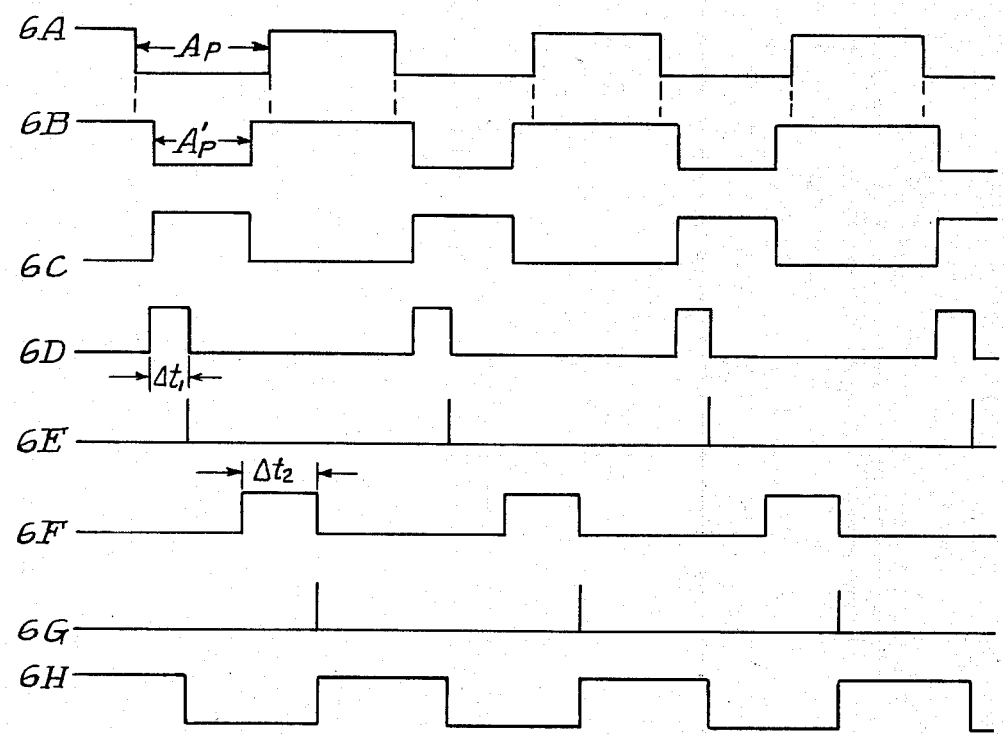
FIG. 6, consisting of 6A through 6H, is a series of curves pertaining to compensation for the particular case in which the duty factor of the pits has been decreased.
Figure 7:
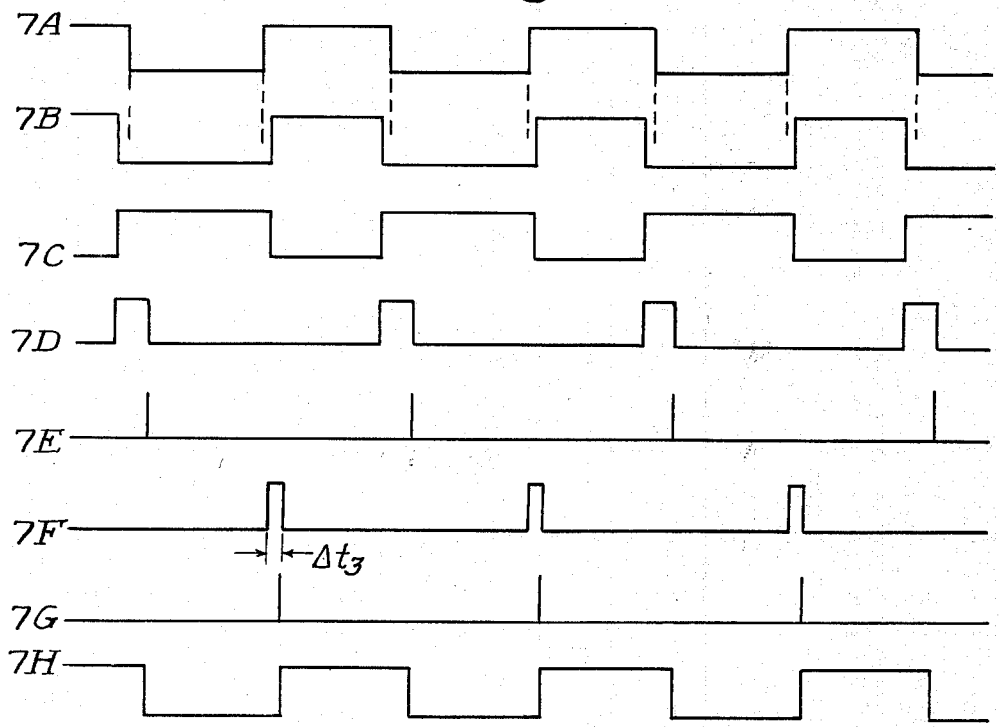
FIG. 7 consisting of 7A through 7H is a similar series of curves related to compensation for the case in which the duty factor has been increased.

In order that compensator 31 may accomplish its necessary function, it must be able to exert controllable time delays to transitional portions of the signal it receives from clipper 30 so that the duty factor of the signal upon which it operates may be changed in the proper sense and requisite amount to achieve duty factor compensation. The compensator may comprise the function blocks or operating units of FIG. 5 and, again, legends have been added to correlate the signals of FIG. 6 to the various components of the compensator. An input terminal which receives the output signal of clipper 30 supplies a polarity inverter 45 which controls a pulse width modulator 46, in turn, controlling a monostable multi-vibrator 47. The input terminal is also connected to a variable pulse width modulator 50 controlling a second monostable multi-vibrator 51. The outputs of the monostable multi-vibrators are fed to a flip-flop or bistable relaxation oscillator 52, the output of which is delivered to an output terminal leading to low pass filter 32. The compensator of FIG. 5 is of general utility in that it may correct for an increase as well as a decrease in duty factor and its operation in these respects is depicted in the curves of FIGS. 6 and 7, respectively.

Comparison of curve 6B with curve 6A (representing a program signal with 50% duty factor) shows that the duty factor of the pits has been assumed to have been decreased. This is represented by the negative polarity portions of the signals which in the idealized waveform of curve 6A are larger than the counterparts $A'_p$ of curve 6B representing the output of the photoreceptor. In order to change the waveform of curve 6B to the optimum condition of curve 6A, it is necessary to, in effect, expand the signal portion $A'_p$ to the value $A_p$ of curve 6A. Clearly, this can be accomplished by selective delays introduced both to the positive and negative-going transitional portions of the waveform since time can be delayed but not advanced.

In operation, the input signal of curve 6B is inverted in polarity by inverter 45 to produce the signal of curve 6C, and the positive-going transitional portions thereof actuate pulse width modulator 46 to develop the pulses of curve 6D. The pulse width modulator is simply a relaxation type of circuit that develops a constant amplitude pulse which also has a constant duration $\Delta t_1$. Curve 6E shows pulses delivered by monostable multi-vibrator 47 which responds to the trailing edges of the individual pulses of the signal of curve 6D. Comparison of the pulses of curve 6E with the negative-going transitional portions of curve 6B show that these transitional portions, in effect, have been delayed by an amount $\Delta t_1$ corresponding to the width of the pulse delivered by modulator 46.

The variable pulse width modulator 50 responds to the positive-going transitional portions of the curve of FIG. 6B to develop the pulses shown in the curve of FIG. 6F. The duration $\Delta t_2$ of each such pulse is determined by the error signal delivered to the variable pulse width modulator from filter 43. The pulse duration is so related to the amplitude of the applied pilot signal that monostable multi-vibrator 51 in responding to the trailing edge of each such pulse produces the timing pulses of curve 6G. Comparison of these pulses with the positive-going transitional portions of the signal shown in the curve of FIG. 6B shows that the positive-going transitional portions have likewise been delayed but by a larger extent than the delay experienced by the negative-going transitional portions. The delays have such relative values that the pulses represented in the curves of FIG. 6E and G, controlling the bistable flip-flop 52, generate the curve of FIG. 6H which has the same duty factor as the signal of curve 6A. That is to say, the compensator has modified the duty factor of the input signal shown by the curve of FIG. 6B in a compensating fashion to deliver at the output terminal the signal of FIG. 6H having an optimum duty factor.

The components constituting the compensator of FIG. 5 are well known, even the variable pulse width modulator 50. The characteristic of this component is that a timing pulse initiates the generation of an output pulse of constant amplitude and of a duration determined by a concurrently applied modulation input signal. As utilized in the described arrangement, timing is initiated by the positive-going transitional portion of the signal of curve 6B, requiring duty factor correction. The modulating signal which determines the width of the pulse supplied by modulator 50 is the error signal from balanced mixer 41 applied to the compensator through filter 43. This modulating signal has a polarity which indicates the sense of duty factor error and a strength reflecting the degree of error. Its control of variable pulse width modulator 50 achieves duty cycle correction.

The relative duration of the pulses supplied by modulators 46 and 50 is chosen so that the arrangement of FIG. 5 has general application, being able to correct for duty factor increases as well as duty factor decreases of the pits in the storage track of the video disc. Specifically, the duration $\Delta t_1$ of the pulses from modulator 46 which is fixed in amount corresponds to the width of the pulses from modulator 50 in the absence of duty cycle error, that is to say, when the error signal applied to compensator 31 is zero. (Actually, in the absence of duty factor error, the signal from the photoreceptors is translated through compensator 31 to discriminator detector 34 without modification but delayed by this same amount $\Delta t_1$.) Also, the response of modulator 50 to finite values of modulating or error signal is adjusted to achieve such delay of the signal under correction as to restore the optimum duty factor. Its operation in correcting for duty factor decrease has been described in relation to FIG. 6. A suitable form of variable pulse width modulator useful in practicing the invention is marketed by Signetics Corporation of Sunnyvale, California under type designation NE/SE 555.

The curves of FIG. 7 correspond to those of FIG. 6 but relate to compensation for the case in which the pit duty factor has been increased which is apparent from a comparison of curves 7A and 7B. The operation is essentially the same as that described in relation to FIG. 6 although in achieving compensation in this case, the duration $\Delta t_3$ of the pulse output from the variable pulse width modulator 50, as shown in curve 7F, is much less than the pulse width $\Delta t_2$ of curve 6F showing the delay required for the circumstances to which the curves of FIG. 6 relate, namely, for a decrease in duty cycle of a particular amount. The pulse duration $\Delta t_3$, determined by the error signal supplied from mixer 41 through filter 43, is appropriate to compensate for duty factor error resulting from an increase in the length of the pits beyond that corresponding to the optimum duty factor. More particularly, the actuating pulses of curves 7E and 7G, timed respectively by the duration of the pulses delivered by modulators 46 and 50, control flip-flop 52 to develop the signal of curve 7H with a corrected duty cycle.

The makeup of compensator 31 of FIG. 3 may be supplied for installations in which duty factor error of a single sense is to be expected. It is entirely possible that perfected techniques of mastering and disc replication will reduce the likelihood of duty factor error to those attributable to cold-flow properties of the disc material in which case decreases in pit duty cycle only will be encountered. In such circumstances the simplified compensator of FIG. 8 will be found suitable. As reflected in the curves of FIG. 9, the signal of curve 9B, received from clipper 30, is applied to a polarity inverter 59. Its output signal, shown in curve 9C, may be delivered to one input of flip-flop 63 which responds to the positive-going transitional portions thereof in generating the output signal of curve 9G. In other words, if curve 9F be considered as the effective control imposed on flip-flop 63, polarity inverter 59 contributes the positive-polarity components for timing purposes and the negative-polarity components are derived from variable pulse width modulator 60. To that end, the signal of curve 9B is supplied to one input of the modulator and its positive-going transitional portions serve as timing pulses to commence the generation of pulses of controllable duration $\Delta t_4$. The error signal from filter 43, which for the assumed conditions is of fixed polarity but variable in amplitude, is applied to another input of the modulator to determine the duration $\Delta t_4$ of the pulses generated. As described in relation to the arrangement of FIG. 5, the pulse duration is a function of the amplitude of the modulating or error signal which, in turn, is a measure of duty factor error. The signal of curve 9E, derived from that of curve 9D by polarity inversion in an inverter 61, is delivered to a second input of flip-flop 63 which responds to the positive-going excursions thereof. Again, with reference to the effective timing control of the flip-flop, indicated by curve 9F, the negative-polarity components thereof are attributable to modulator 60.

Figure 8:
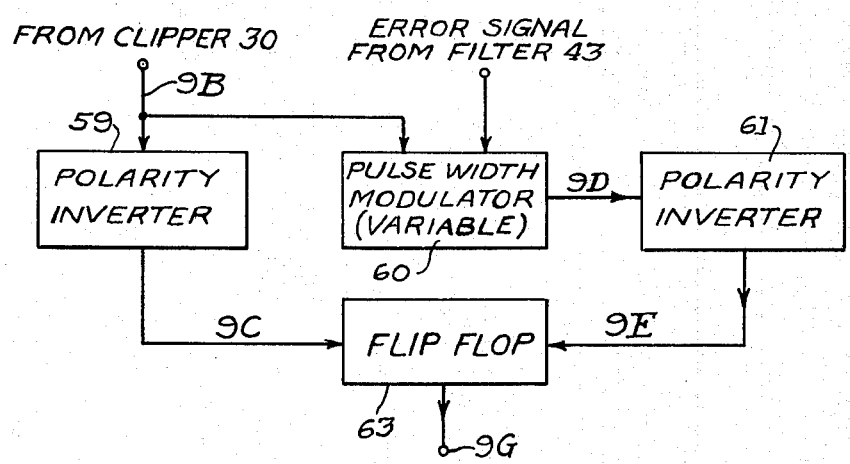
FIG. 8 is another form of compensator useful for installations in which only decreases in duty factor are expected.
Figure 9:
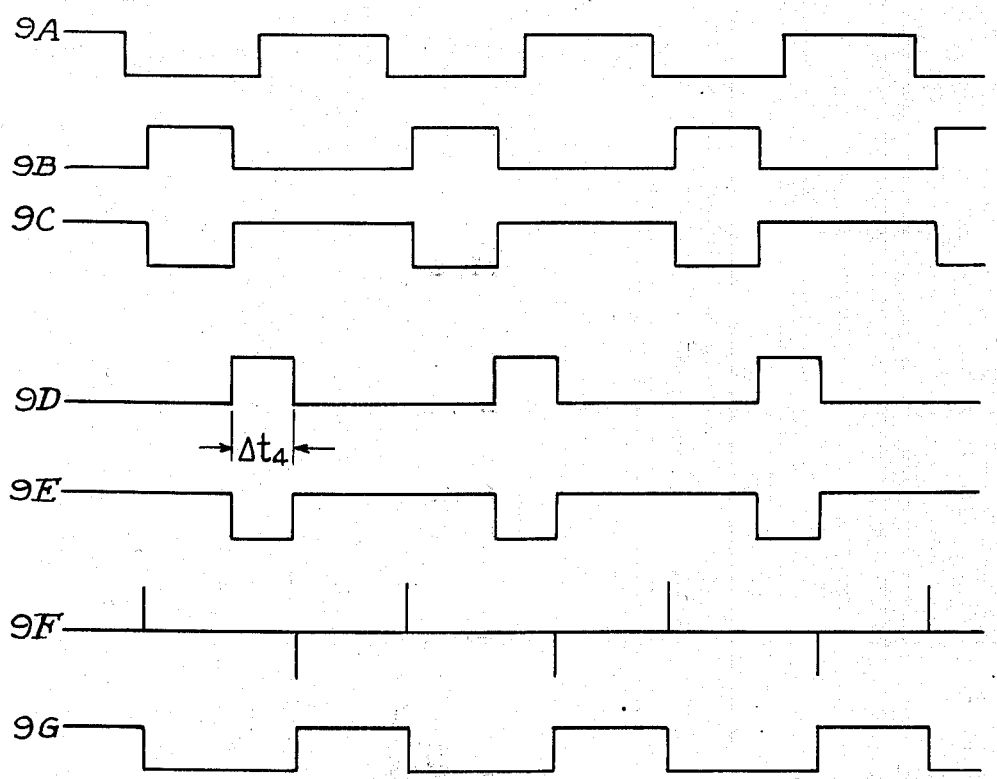
FIG. 9 consisting of 9A through 9G is a series of curves depicting the operation of the arrangement of FIG. 8.

Of course, for the assumed special situation in which the compensator arrangement may be simplified to that of FIG. 8, there is a possibility of simplifying the arrangement of FIG. 3. More specifically, both the mixer 41 and filter 42 may be eliminated.

While there have been described particular embodiments of the present invention, it is apparent that changes and modifications may be made therein without departing from the invention in the broader aspects. The aim of the appended claims, therefore, is to cover all such changes and modifications as fall within the true spirit and scope of the invention.

What is claimed is:

1. In an optical playback system for reading out information stored in the form of a track on a video record, which track comprises a succession of pits separated by lands and for which there is a desired duty factor but which, in the presence of pit distortion, exhibits duty factor error, said pits and lands collectively constituting a spatial representation of a carrier signal frequency modulated by a band of video components and by another component unrelated to video information which component, in the presence of duty factor error, produces a spurious counterpart in the baseband, an arrangement for adjusting duty factor to compensate for duty factor error which comprises:

photoreceptor means responsive to the reading of said record track with a beam of energy for deriving an output signal representative of said frequency modulated carrier signal and, in the presence of duty factor error, further representative of said spurious component which has a phase and intensity indicative of the sense and extent of said duty factor error;

a frequency selector for deriving said spurious component from the output of said photoreceptor means;

a compensator comprising:

means responsive to said derived output signal for developing a first set of timing signals;

means responsive to said derived spurious component for selectively delaying alternate transitional portions of said derived output signal by an amount related to the amplitude of said spurious component for developing a series of adjusted width pulses;

means responsive to said adjusted width pulses for developing a second set of timing signals; and means responsive to said first and second set of timing signals for generating a signal having a duty factor corresponding to said desired duty factor for adjusting the duty factor of said derived frequency modulated output signal to compensate for said duty factor error.

2. An arrangement in accordance with claim 1 which further includes a second frequency selector for deriving said other component, a mixer responsive to said derived spurious component and to said derived other component for developing an actuating signal having a polarity indicative of the sense of said duty factor error and an amplitude related to the extent of said duty factor error and means for applying said actuating signal to said means for developing said series of adjusted width pulses.

3. An arrangement in accordance with claim 1 in which said means for developing said first set of timing signals comprises a fixed width pulse modulator and a first monostable multivibrator and in which said means for developing said second set of timing signals comprises a second monostable multivibrator.

4. An arrangement in accordance with claim 3 in which said means responsive to said timing signals comprises a bistable oscillator.

* * * * *